March 30, 1954

G. O. ERICKSON 2,673,544

TELEPHONE CALL RECORDER

Filed Feb. 16, 1953

INVENTOR.
GERHARD O. ERICKSON
BY
Lynn & Latta
ATTORNEY

Patented Mar. 30, 1954

2,673,544

UNITED STATES PATENT OFFICE 2,673,544

TELEPHONE CALL RECORDER

Gerhard O. Erickson, Inglewood, Calif.

Application February 16, 1953, Serial No. 336,929

5 Claims. (Cl. 116—114)

This invention relates to a vibration responsive device which may be utilized, for example, for indicating whether a telephone call had been made during the would-be recipient's absence.

The principal object of the invention is to provide a simple and inexpensive device which when actuated by vibration (such, for example, as by the vibration which results from the ringing of a telephone bell or buzzer) will change its position so as to indicate that the act of vibration (the ringing of the telephone) had taken place during the would-be recipient's absence.

An important object of the invention consists of providing an indicator device which is very simple and which readily lends itself to inexpensive manufacturing technique.

Another object of the invention is to provide an indicating device which can be incorporated into a device having an additional useful function such as an ash tray.

Other objects and advantages will become apparent upon reading the following specification and upon examination of the drawing in which.

Figure 3:
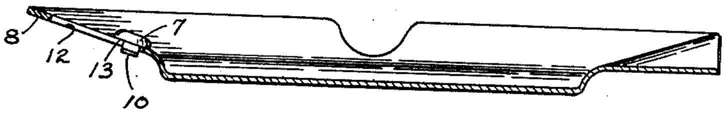
Fig. 3 is a side elevational sectional view of the invention.
Figures 1, 2, 4:
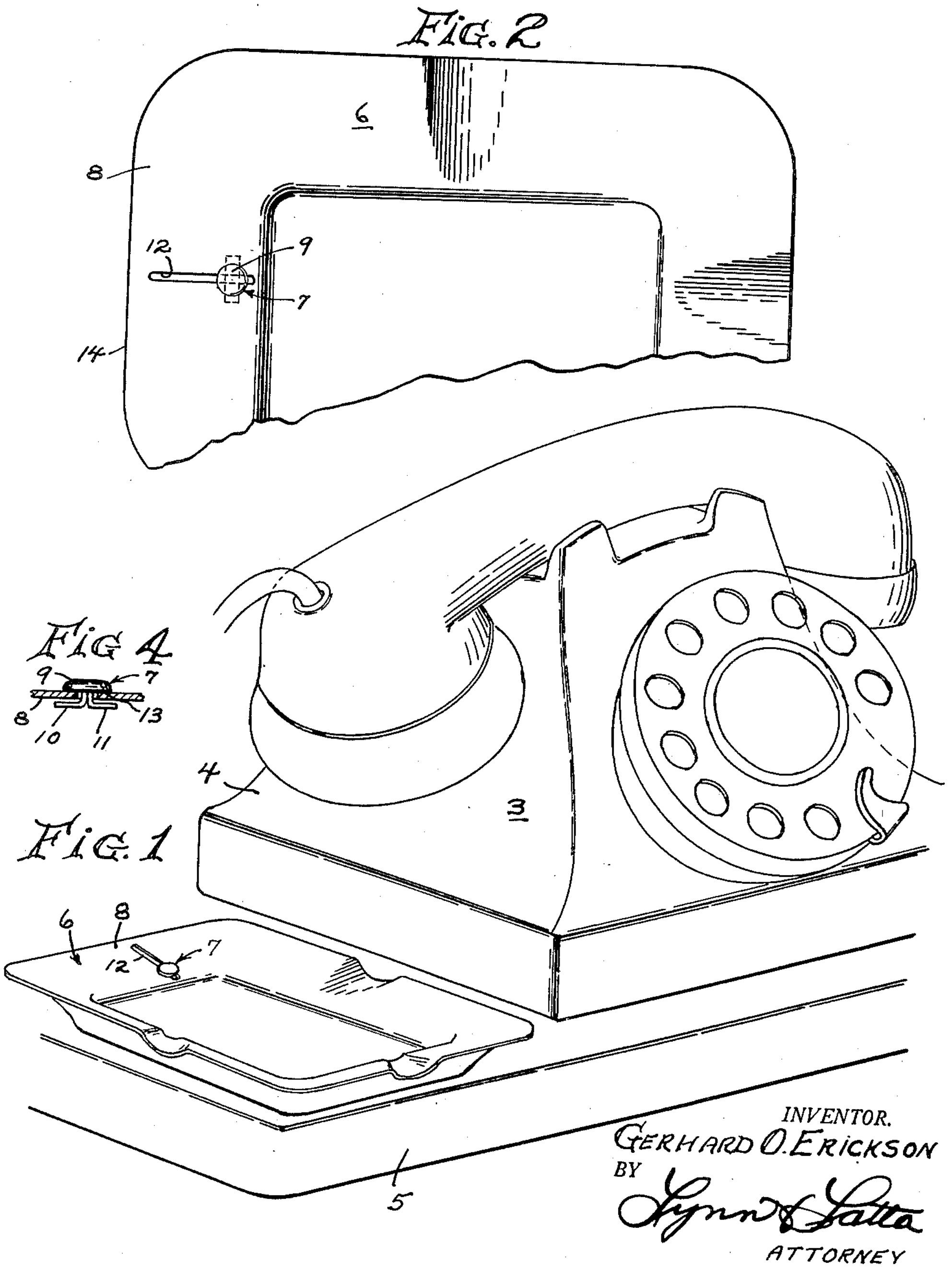
Fig. 1 is a perspective view of a conventional telephone and telephone stand together with a perspective view of my invention.
Fig. 2 is a plan view partly broken away showing an ash tray embodying my invention.
Fig. 4 is a detail view of the indicator device per se.

In one embodiment of the invention, and this is the preferred embodiment, I have shown my indicating device incorporated into a smoker's ash tray, the ash tray resting on a table top type of telephone stand, which stand also accommodates a conventional type phone in use today, wherein the buzzer or bell is enclosed within the housing 4 of the telephone. I have found that in a telephone of this type there are vibrations set up whenever the bell rings, which vibrations are transmitted to the walls of the telephone housing 4. By mounting the telephone 3 on a table top type of telephone stand 5, which stand is preferably formed of some type of sheet material hard enough to function satisfactorily to transmit the vibrations from the telephone housing 4 to the ash tray, which is generally designated as 6, I have made it possible to transfer the vibrations set up within the telephone 3 to the ash tray 6 through the medium of the stand 5.

It will be understood that the telephone stand will have a supporting structure (not shown) which will not appreciably absorb the vibrations set up within the telephone 3 or at least will not materially impede the functioning of the stand 5 in serving in the nature of a sounding board for transferring the telephone vibrations to the tray 6.

The tray 6 may be associated with the stand 5 simply by resting it thereon without employing any means for temporarily anchoring the tray to the stand and in this type of arrangement, the tray being formed preferably from some type of sheet material hard enough to function well for transmitting vibrations to the indicating button 7, I have found it possible to transmit vibrations into the flange 8 of sufficient amplitude as to cause movement of button 7 relative to flange 8.

The button referred to generally as 7 includes a head portion 9 and a pair of leg portions 10 and 11 projecting therefrom, said leg portions extending through an elongated slot 12 formed in the flange 8. The leg portions are bent outwardly away from each other after the legs are inserted through the slot 12. In the process of bending the legs, a bifurcated shim could be manipulated over the slot and the legs 10 and 11 then bent against the respective faces of each shim leg, the shim then being withdrawn along the under surface of flange 8 thereby leaving the legs 10 and 11 normally spaced from the underneath surface of flange 8. The amount of spacing need only be sufficient to allow the button 7 to slide down the "runways" provided by the upper surface of flange 8 alongside each side of slot 12.

It will be understood that the underneath surface 13 of the head 9 of button 7 rests by gravity on the upper surface of flange 8 and its frictional contact with the upper surface of flange 8 is sufficient so that the button, when manually moved to the upper extremity of slot 12, will remain there until tray 6 is vibrated. I have found that the angle of inclination of flange 8 relative to a horizontal plane will be suitable within a variable range of a few degrees, say about 12 to 21 degrees and that an inclination angle of about 16 or 17 degrees is quite satisfactory to assure that button 7 will remain at the upper end of slot 12 until tray 6 is vibrated and then button 7 will slide down to the lower extremity of slot 12.

Thus if one is expecting a phone call from a certain person on a certain day, he can leave the phone unattended after moving the button 7 to the upper extremity of the slot and upon returning later, if the button is at the lower end of the slot, he will be informed that the phone has rung during his absence.

It will be noted that slot 12 extends in the same direction as the maximum inclination angle of flange 8 relative to a horizontal plane, i. e. the slot is at approximately right angles to the edge 14 of the tray. The tray can be made of a single stamping, such as from metal, or it could be molded from plastic or similar materials. The edges of slot 12 would be freed of any burrs resulting from a stamping or molding operation. The button 7 could be made as a single stamping with one or two legs integral with head 9, however another suitable type of button would be one similar to a conventional paper fastener wherein the legs are a continuous piece of strip material and formed in a general T-shape with the cross bar portion nested within the convex-concave head made as a stamping and having portions of its peripheral edge crimped over the cross bar portion to anchor same relative to the head.

It will be noted that by using an ash tray of the type disclosed wherein the side flanges, including flange 8, project out into free space from the base 16, the vibrations transmitted from the base to its flanges are amplified somewhat thereby tending to enhance the effectiveness of the operation of the indicating device (the movement of button 7 down the incline provided by flange 8).

I claim:

1. In an indicator device for indicating the actuation of the audible signalling device of a telephone of a type having a housing adapted to rest upon a horizontal supporting surface: a tray having a base adapted to rest upon said supporting surface alongside the telephone and having a rim flange inclined outwardly and upwardly from said base at an angle of between 12° and 21° above the plane of said base, said flange having therein a slot the longitudinal axis of which has an inclination corresponding to that of said flange; an indicator button including a head slidably resting on the upper surface of said flange, a stem extending through said slot, and retainer means at the lower end of said stem, cooperating with the lower surface of the flange, to retain said stem captive in said slot; said indicator element having frictional engagement with the upper surface of said flange sufficient to support the same in a set position at the upper end of said slot but insufficient to restrain the button from sliding downwardly in said slot in response to vibration transmitted from the telephone housing through said supporting surface and into said tray.

2. In an indicator device for indicating the actuation of the audible signalling device of a telephone of a type having a housing adapted to rest upon a horizontal supporting surface: a tray including a base adapted to rest upon said supporting surface adjacent said telephone housing and a rim flange inclined outwardly and upwardly from said base, said flange having therein an elongated slot the longitudinal axis of which subtends an angle of between 12° and 20° with the plane of said base; and an indicator button comprising a head resting on the upper surface of said flange at the margins of said slot, a stem extending downwardly through said slot, and retainer means on the lower end of said stem cooperating with the under face of said flange to retain said button captive in said slot; the relationship between the frictional association of said button with said flange and said angle of inclination of the slot being so related that said button will retain a position in which it may be set at the upper end of said slot until the actuation of said telephone signal and, in response to vibration resulting from such actuation and transmitted from the telephone housing through said supporting surface into said tray, will then slide to the lower end of the slot.

3. An indicator device as defined in claim 2, wherein said stem comprises a pair of legs of narrow strip metal, the lower ends of which are bent outwardly to provide said retainer means.

4. In an indicator device for indicating the actuation of the audible signalling device of a telephone of a type having a housing adapted to rest upon a horizontal supporting surface: a tray of formed sheet material including a base portion and a rim flange inclined upwardly and outwardly from said base portion and subtending an angle of between 12° and 20° with the plane of said base portion; and an indicator button including a head resting upon the upper face of said flange at the margins of said slot, a stem projecting downwardly through said slot, and retainer means on the lower end of said stem cooperating with the under face of said flange to retain said button captive in said slot, said retainer means having clearance below the under face of said flange whereby retention of said button in a set position at the upper end of said slot will depend largely upon frictional engagement between the underside of said head and said upper surface of the flange, the relationship between said frictional engagement and the angle of inclination of said slot being such that, when thus set at the upper end of the slot, said button will retain its set position until the actuation of said telephone signal mechanism will transmit vibrations from said housing through said supporting surface and into said tray, and being such that in response to said vibration said button will slide to the lower end of said slot.

5. A device as defined in claim 1, wherein said angle is approximately 17°.

GERHARD O. ERICKSON.

References Cited in the file of this patent

UNITED STATES PATENTS

| Number | Name | Date |
|---|---|---|
| 2,089,772 | Thalau | Aug. 10, 1937 |